United States Patent [19]

LeRoux

[11] Patent Number: 4,571,965
[45] Date of Patent: Feb. 25, 1986

[54] BICYCLE LOCK

[76] Inventor: Paul LeRoux, 2120 Timberlane, Wheaton, Ill. 60187

[21] Appl. No.: 569,788

[22] Filed: Jan. 11, 1984

Related U.S. Application Data

[63] Continuation-in-part of Ser. No. 528,217, Aug. 31, 1983, abandoned, which is a continuation-in-part of Ser. No. 460,545, Jan. 24, 1983, abandoned.

[51] Int. Cl.$^4$ .............................................. B62H 5/16
[52] U.S. Cl. ......................................... 70/227; 70/233
[58] Field of Search .................. 70/226, 227, 233, 19, 70/58, 61, 63; 211/5, 8; 248/551, 553; 24/68 CT, 69 T; 224/30 R, 35, 39

[56] References Cited

U.S. PATENT DOCUMENTS

| 1,402,725 | 1/1922 | Pippen | 70/227 |
| 1,428,649 | 9/1922 | Miller | 70/227 X |
| 2,232,310 | 2/1941 | Boyler | 70/227 |
| 3,832,871 | 9/1974 | Kaufmann | 70/227 |
| 3,965,709 | 6/1976 | Belke | 70/227 |

FOREIGN PATENT DOCUMENTS

| 668993 | 11/1929 | France | 70/227 |
| 224110 | 10/1942 | Switzerland | 70/61 |

Primary Examiner—Robert L. Wolfe
Assistant Examiner—Yinh Luong
Attorney, Agent, or Firm—Kirkland & Ellis

[57] ABSTRACT

This device is a bicycle lock that prevents unauthorized movement of a bicycle. The lock permanently fastens to the tubing of a bicycle frame and includes a locking bar which hooks the front or back wheels to the frame. The lock has two major parts—a combination or key lock and attaching saddle that permanently attaches to the bicycle frame, and, the locking bar or shackle. The saddle is positioned on the frame adjacent to the back or front wheel. The wheel holding part of the shackle hooks around the rim of either the back or front tire. The shackle part fastens into the saddle lock on the bicycle frame in alignment with the frame. This causes the wheel and the frame to be joined so that the wheel cannot be removed and the bicycle cannot be ridden. When the bicycle is unlocked, the locking bar is secured in a carrying position in which it cannot be jarred loose. A flexible cable may be used with the lock to attach the bicycle to a stationary object to render the bicycle immobile.

2 Claims, 17 Drawing Figures

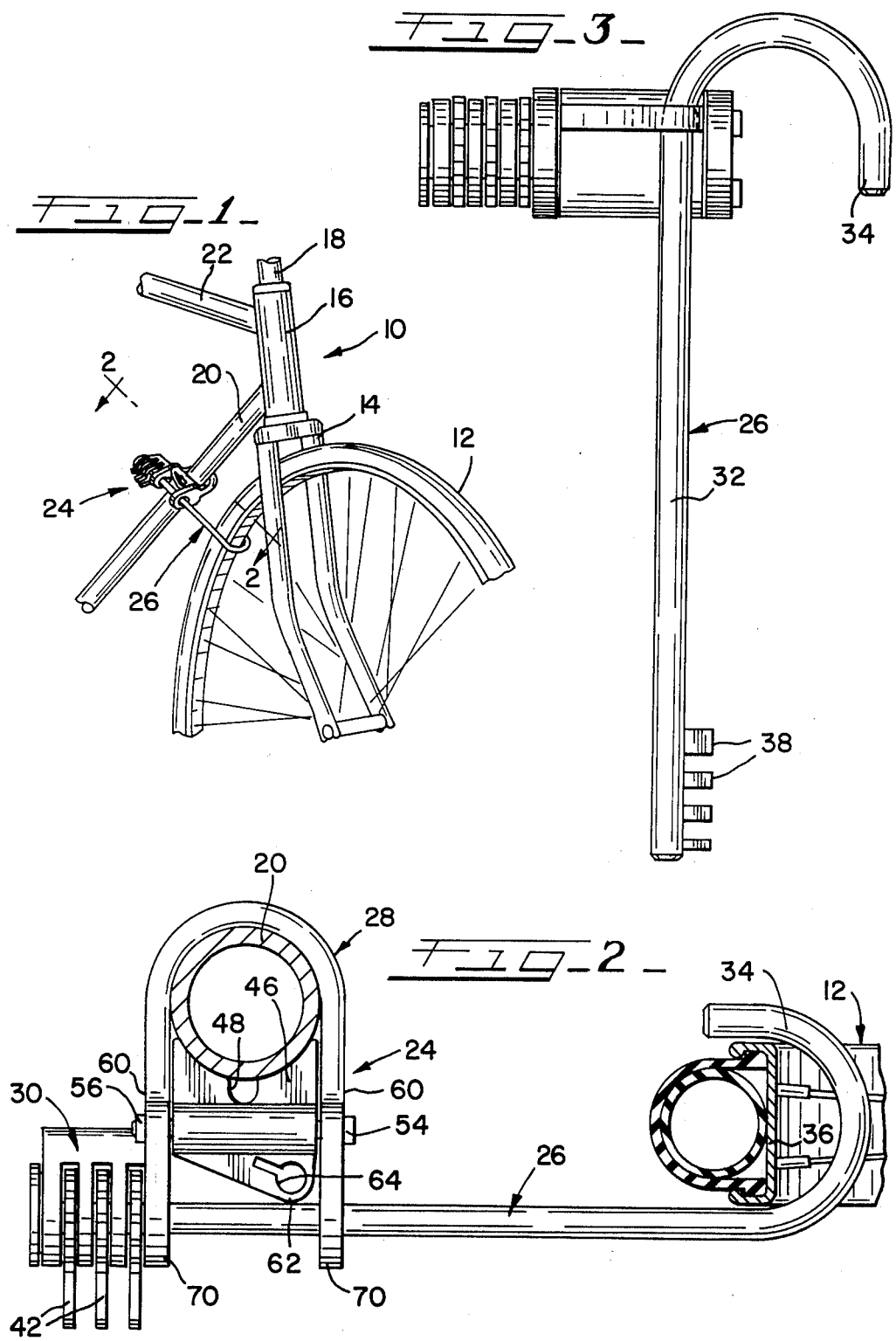

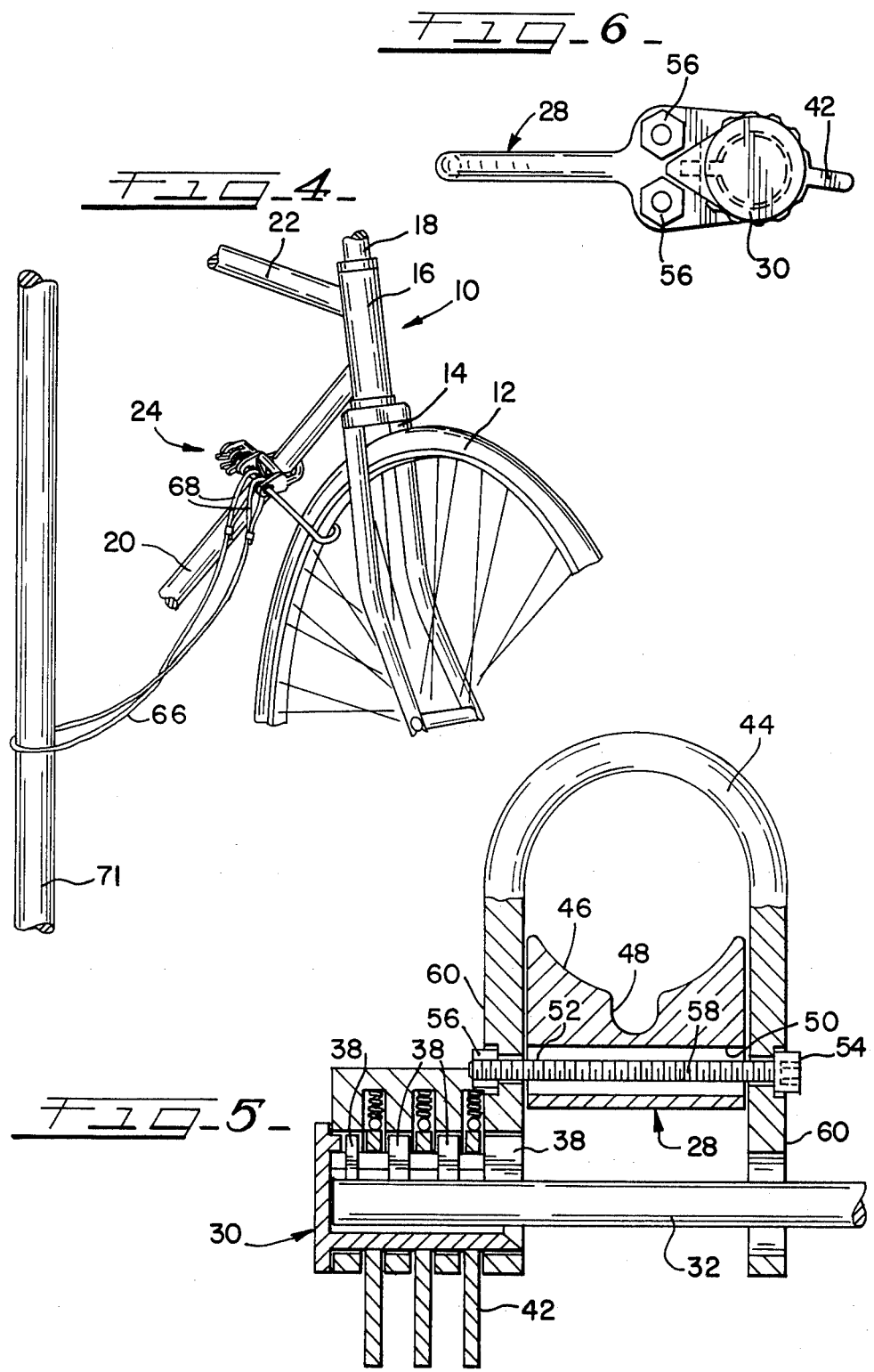

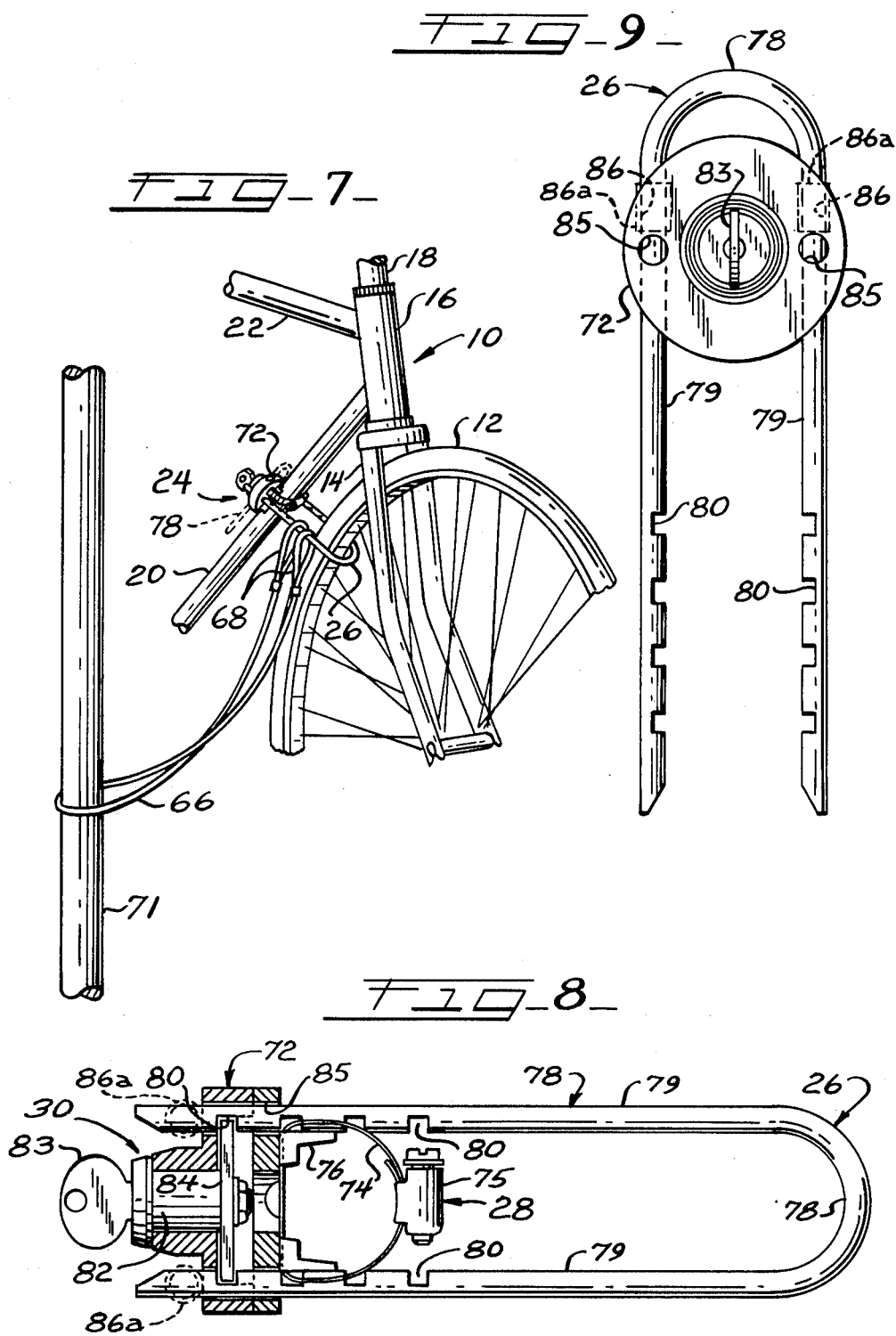

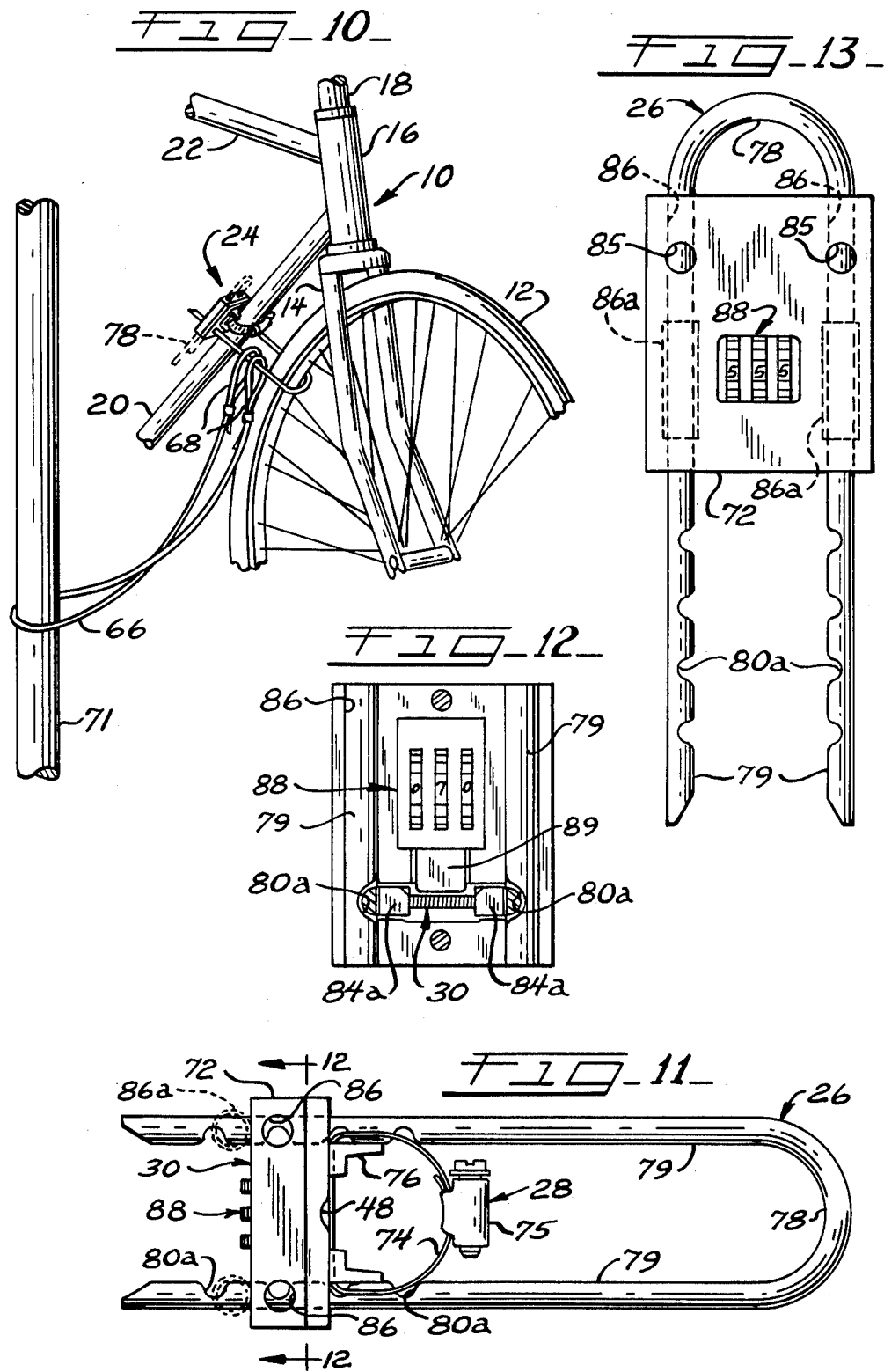

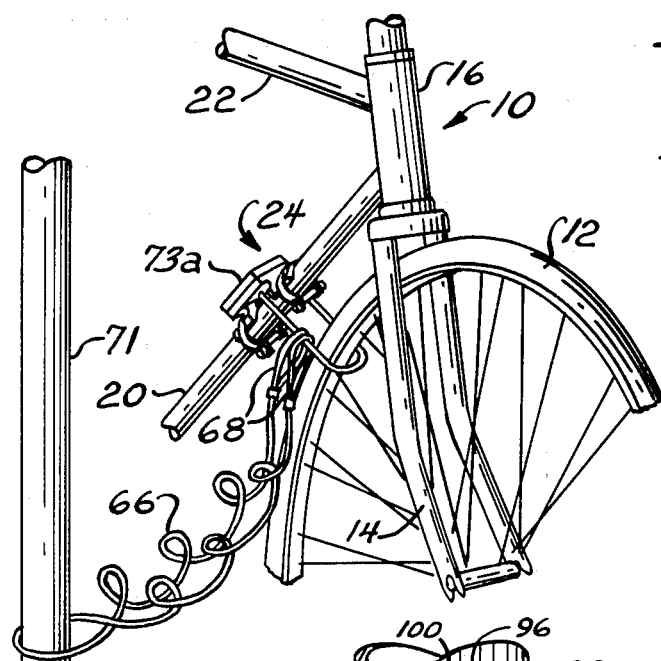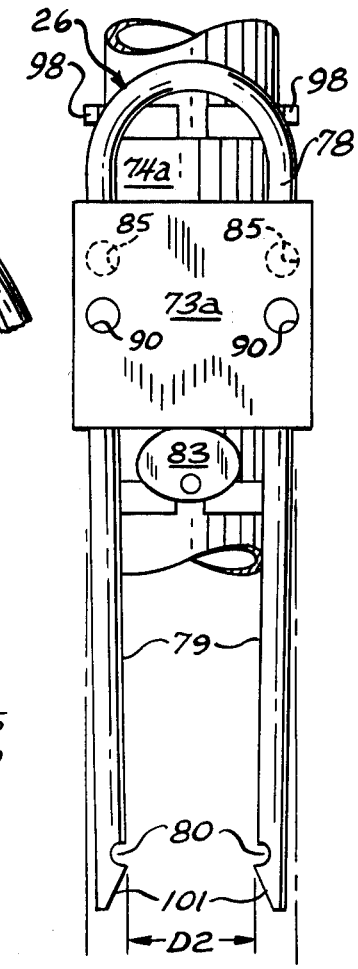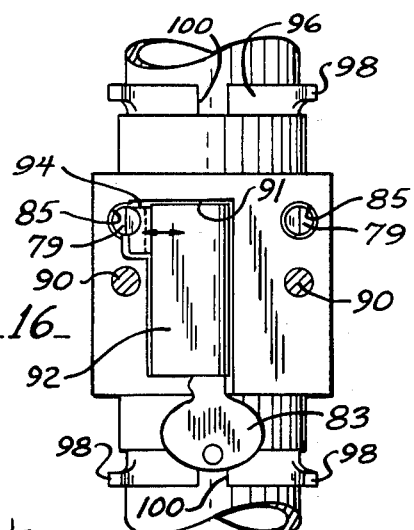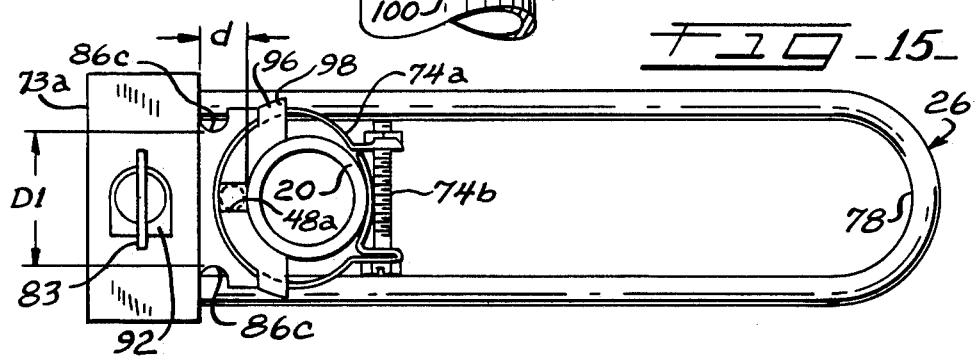

BICYCLE LOCK

This is a continuation in part of application Ser. No. 528,217 filed Aug. 31, 1983, now abandoned, which is a continuation in part of application Ser. No. 460,545 filed Jan. 24, 1983, now abandoned.

BACKGROUND OF THE INVENTION (1) Field of the Invention

This disclosure pertains to locking devices for bicycles and in particular those types of devices which include a saddle and lock cylinder permanently affixed to the bicycle frame and a removable locking bar which extends from the lock in alignment with the frame and encircles a portion of the wheel to prevent unauthorized movement of the bicycle.

(2) Description of the Prior Art

Theft has always been a problem for bicycle owners. Consequently, there have been many attempts to develop portable, unobstructive, economical and reliable bike locks.

One such device is the Zane et al. U.S. Pat. No. 4,155,231 (1979). This device shows a U-shaped shackle, a cross piece and a simple cam type of lock. This disclosure shows one type of lock which has met with varied degrees of acceptance. However, the lock tends to be rather expensive and bulky. It is not easily stored on the bike in an out of the way position which will not interfere with movement and/or the rider's ability to control or alight from the bicycle.

Another type of locking arrangement is the Hurwitt U.S. Pat. No. 3,906,758. This device shows a combination cable lock which provides a housing containing a cable on a spring wound spool. Thus when the cable is not being used, it is wound around its associated spool and can be unwound for purposes of wrapping it around an adjacent stationary article or extending it through the wheels of the bicycle to prevent theft.

Another type of bicycle lock, Smith U.S. Pat. No. 3,824,540, shows a cable that when pulled out of its housing wraps around the wheels of a bicycle and an adjacent object such as a bicycle rack, light post or parking meter. Smith also provides an electrical circuit which produces current flowing through the cable, when current flow is interrupted, as would occur when the cable is cut by a would be thief, an electronic circuit senses the interruption in current flow and sounds an alarm. Like some of the earlier devices, this product has not received widespread acceptance because the housing is somewhat large and bulky and it is cumbersome to transport and store the large cable.

Other products in the prior art include conventional locks having a steel case and a long shackle with two legs which are inserted into the case. The shackle may be fitted over the bicycle fork and through a wheel spoke. When the case is attached to the shackle, the wheel cannot be moved. One problem with this type of lock occurs when it is attached to a front wheel. The lock can be removed by simply removing the front wheel. This has presented problems because many expensive bicycles have front wheels which can easily be removed without wrenches. Because such shackle locks do not hold the wheel to the frame, the wheel is not secured. These types of locks must be used with long cables to secure the wheel to the frame. On the other hand, the lock shown herein has a large, wide shackle which easily fits around a bicycle wheel and a large frame member in a position of alignment with the frame.

The problems associated with the foregoing products are eliminated by the present invention. This device is economical and efficient. It locks and unlocks very quickly, easily, is stored on the bicycle and does not interfere with the normal operation or control of the bicycle.

Also, the device shown herein can be used as a single unit to merely lock a wheel or can be used in combination with a high strength cable that can be attached to bicycle racks or other stationary objects. The bicycle then is rendered substantially immovable.

SUMMARY

This disclosure pertains to bicycle locks. This new lock is a small, portable lock which is attached to a bicycle frame. It has a shackle that makes the wheel immovable thus preventing unauthorized movement of the bicycle. This lock device fits any bicycle.

Structurally the lock provides a saddle-type of clamp and lock cylinder that are attached permanently to the tubing of the bicycle frame such as the diagonal bar adjacent to the front wheel. When the lock shackle is fitted about a wheel, in alignment with the frame or the tubing which connects with the seat and connected with the lock lock cylinder it will securely hold the adjacent wheel and prevent its movement or removal. When not in use, the locking bar is fitted in carrier slots on the saddle. Combination and keyed locks are shown. The combination lock is convenient because the user is not required to carry around a key and the combination lock can be easily dialed and operated even in the presence of rain, ice, snow and the like. A key lock can also be used.

A cable may also be used to attach the bicycle to a stationary object such as a bicycle stand, tree or the like to prevent the bicycle from being carried away.

It is an object of this disclosure to provide a reliable, small lock attached to the bike frame when not in use and which can be easily used to secure the bike frame to one wheel of the bicycle.

Another object of this disclosure is to provide a saddle and a clamp arrangement adapted for attachment to any size bike frame member.

It is yet another object of this disclosure to provide a bicycle lock used in combination with a flexible, high strength cable, having loops at both ends which may be wrapped around a bicycle rack, telephone pole or the like to prevent theft of the bicycle.

A further object of this disclosure is to show a lock having a case which is mounted to a bicycle frame member on the side of the frame member away from an adjacent wheel and which receives a locking bar fitted about the wheel to prevent movement and removal of both the wheel and the lock by having the case form part of the locking structure encapsulating the frame member and wheel.

Another object of this disclosure is to show a bicycle lock wherein the lock case is a two piece unit and has a hollow compartment which contains a modular locking cylinder which can be easily assembled as a unit without the use of special assembly tools and without consuming a long time.

Another object is to provide a bicycle lock with a U-shaped shackle that can be stored on cutout portions of the lock housing.

Yet another object of this disclosure is to show a bicycle lock with a lock case having saddle-type attachment collars extending from each end to receive a clamping member for attaching the case to a bicycle frame member.

Another object of this disclosure is to show a lock with a U-shaped shackle having legs with tapered or chamfered ends and constructed in a non-parallel relationship to thereby allow the legs to separate a short distance when urged into the stored position and provide a spring force to hold the shackle securely in position during bicycle operation or transport on automobile, train or the like.

These and other objects of the invention would become apparent to those having ordinary skill in the art with reference to the following description, drawings and appended claims.

DESCRIPTION OF DRAWINGS

FIG. 1 is an illustration of a portion of the bicycle showing the device in the locked position;

FIG. 2 is a partial sectional taken generally along lines 2—2 of FIG. 1;

FIG. 3 is a top view of the device with the locking bar in a stored position;

FIG. 4 is an illustration of the front portion of a bicycle showing a modified form of the invention using a flexible high strength cable;

FIG. 5 is a sectional view of the saddle;

FIG. 6 is an end view of the lock;

FIG. 7 is a prospective illustration of a modified form of the envention shown in position on a bicycle;

FIG. 8 is a sectional view of the modified locking device shown in FIG. 7;

FIG. 9 is a plan view of the lock shown in FIG. 7;

FIG. 10 is a pictorial illustration of yet another modified form of the invention;

FIG. 11 is a side view of the locking device shown in FIG. 10;

FIG. 12 is a sectional view taken generally along line 12—12 FIG. 11;

FIG. 13 is a plan view of the modified form of the locking device shown in FIG. 10;

FIG. 14 is an illustration of the front portion of a bicycle showing yet another modified form of the lock;

FIG. 15 is a view of the lock arrangement as it would appear clamped to a bicycle frame member;

FIG. 16 is a cut away of half of the lock case showing the locking cylinder;

FIG. 17 is a view of the lock showing the shackle in the stored position.

DESCRIPTION OF THE PREFERRED EMBODIMENTS

FIG. 1 shows the front portion of a bicycle designated by the numeral 10. The bicycle includes the usual front wheel 12 fitten in an associated fork member 14 which swivels in a housing 16. A portion of the handlebars 18 are shown extending upwardly from the housing 16. A diagonal tube 20 extends downwardly from the housing 16 and a second tubular frame member 22 extends in a horizontal direction from the housing 16. While it is anticipated that this is a common structure for all bicycles it is also contemplated that the lock shown in this disclosure can be adapted and used with other types of bicycles having various sized tubing members and tubing designs. The lock disclosed herein is described with reference to bicycles but also can be used in tricycles, motorcycles, mopeds and any type of transportation device having frame members located adjacent to wheels having spokes or other openings for insertion of a locking member.

The lock is designated generally by numeral 24, and provides a high strength lock bar or shackle 26, a saddle clamp arrangement 28 and a lock mechanism 30. Several versions of the invention are shown. Essentially the shackle 26 shown in FIGS. 1–6 has an elongated shaft 32 having a hook portion 34 at one end adapted to fit about the rim 36 of a bicycle wheel as shown in FIGS. 1 and 2. The other end of the shackle 26 includes four locking teeth 38. These teeth are adapted to fit within the mechanism 30 and held in place by the usual locking members such as pins, springs and the like as shown in FIG. 5. The lock cylinder disclosed herein is shown as a combination lock having dial members 42 which are arranged in a predetermined order at the factory to provide a lock with a customized combination which can only be operated by the purchaser. It is contemplated that the invention is not to be limited to combination locking arrangements and a high security key lock could also be used.

The saddle clamp designated generally by the numeral 28 allows the lock to be permanently and securely attached to a tubular frame member. In attaching the lock to a frame, one merely disassembles the clamp portion 46 from the saddle 44 and then applies the saddle 44 over the bike frame adjacent to the front or back wheel as shown in FIG. 1. After initially positioning the saddle 44 to dispose the lock at the adjacent position to the wheel, the clamp member 46 is then placed in position followed by attachment of the fasteners 52 to secure the saddle and clamp securely around adjacent tube 20. As shown in the illustration, the clamp member 46 has a cut out 48 which allows the clamp jaw portion to fit about any cable which may be located on the frame member 20. Also, the clamp portion 46 has an enlarged bore 50 which provides some clearance about the shaft 58 of the fastener 52 to allow the clamp to be easily fitted about various sized tubing frame members such as are used in the bicycle industry. Once the clamp and saddle are in position, the socket head 54 can be turned with an allen wrench or other suitable device to securely urge the legs of the saddle together to grasp the clamp 46 and hold it securely in position. It is contemplated that the fastener 52 will provide a security feature by using a socket head bolt which is flush with sides 60 of the saddle housing.

Saddle clamp 28 also provides an extension tab 62, (FIG. 2) having a keyhole opening 64 through which the end of the lock bar 26 having teeth 38 may be inserted. When placed in such position, the locking bar is securely stored and cannot be jarred free or otherwise inadvertently removed.

One form of the invention contemplates using a high strength cable 66 (FIGS. 4, 7, 10) having loops 68 at both ends. The cable can be wrapped around a stationary object 71 such as a light post, bicycle rack and the bike. In this position, the loops are placed between the side extensions 70 of the saddle 28. Next, the lock bar 26 is inserted into the lock 30, passing through the loops 68 of the cable 66. Thus, the cable is secured and cannot be removed until the lock bar 26 is removed from the lock cylinder 30.

FIGS. 7–13 show two modified forms of the invention. Essentially, FIGS. 7–9 show a key operated lock model and FIGS. 10–13 show a combination lock model. Thus, the following description utilizes the same reference numerals that describe the earlier version where these numerals reflect similar parts.

Like the earlier version the modified form shown in FIG. 7 utilizes a shackle bar 26 which has an elongated, "U" shaped configuration and locks into a case 72. An attaching band 74 is fitted to the underside of the case 73 and has a screw for tightening and attaching the band around a bicycle frame. The case 73 includes suitable clamp jaws 76 which form a saddle to permit the band 74 to be attached to the case 72 and attached to a frame member.

The shackle 26 is "U" shaped and includes a first rounded portion 78 having a pair of legs 79 attached thereto. Each of the legs 79 includes a number of notches 80. The legs 79 are inserted into openings 85 in the case 72 and a lock mechanism 82 which includes a key 83 is actuated by turning the key 83 in order that a high strength cam lock 84 may be rotated into the spaced and aligned openings 80 to securely lock the device.

As shown in FIG. 7, the case 72 is positioned on the diagonal tube 20 on the side away from the front wheel 12. When the shackle legs 79 are inserted into the associated openings 85 the round end of the lock along with the two legs 79 and the case 72 form an enclosure which securely attaches and restrains the rim or the wheel 12 and the frame member 20. Even though the attaching bands 74 may be loosened the security and integrity of the lock is not impaired in any fashion.

As shown in phantom in FIG. 7 and also in FIG. 9, when not in use to lock the bicycle, the shackle member 26 is inserted into storage openings 86 which extend through the case 72. Tubes 86a or suitable clips can be located on the exterior of case 72 to provide means for storing shackle 26 without boring openings 86. Thus the legs extend downward of the case 72 and are held in place by gravity. This storage feature allows the shackle 78 to be easily removed from the housing 72 when it is desired to lock the bicycle.

Another form of the invention as disclosed in FIG. 10 shows a combination lock 88 fitted within the lock housing case 72. Lock mechanism 30 shown in FIG. 12 includes a pair of lock bolts 84a pushed outward by a spring 85 into the rounded openings 80a of the shackle leg members 79. When a proper combination is reached, camming action between the ends of the lock bolts 84a and the rounded openings 80a spring the bolts together and additional camming action between the bolts and a lock pin 89 forced the lock pin upward to allow the shackle to be removed.

As with the earlier form of the invention shown in FIGS. 1-5, these two forms of the invention shown in FIGS. 7-13 can also be used with a cable 66 by positioning cable loops 68 over one leg 79 of the shackle 26.

These modified forms of the invention shown in FIGS. 7-13 offer simplified designs of locks which attach to a bicycle in alignment with the frame and securely hold the bicycle wheel to an adjacent frame member and prevents unauthorized movement. When not in use, the locking bars shown on all three devices may be conveniently stored on the lock in an out of the way position which does not interfere with the rider.

FIGS. 14-17 shown another modified form of the invention which provides a modular locking arrangement comprising a lock housing or case 24 which consists of two halves connected by rivets 90. As shown in FIG. 16, each half of the case 24 has a chamber formed therein and designated by numeral 91. Located within the chamber 91 is a modular lock cylinder 92 having the usual lock bolt 94 which extends therefrom. When the Unit is assembled and the key 83 turned, the lock bolt 94 will reciprocate back and forth as shown by the arrow in FIG. 16. The lock bolt is self-actuating and thus allows the unit to be locked without the use of a key.

A saddle 96 is located at each end of the housing 24. Saddle 96 is semi-circular and fits about a frame member 20. Projections or ears 98 extend from each end of saddle 96. The saddle members 96 are split in the middle with a slot 100 to accommodate a gear shift cable or a brake cable which may run along the surface of the frame tube member 20. Thus this lock can be attached without interferring with the operation of the bicycle or requiring modifications to be made with the bicycle.

A clamp member 74a includes a circular metal band and a fastener 74b to allow the band to be tightened to securely nest the saddle 96 about the frame member 20 and hold the lock in position on the frame member. Should the band become loosened after initial tightening, the saddle ears 98 will prevent the band from becoming disengaged from the saddle 96.

Each saddle 96 is spaced from the lower housing of the lock case 73a to provide a distance between the key 83 and tube 20 which is large enough to permit the user to easily insert the key into the lock cylinder to unlock the lock.

Another feature of the saddle arrangement is shown by the cutouts 86c which are located between the case 73a and the saddle 96. These cutouts are located to receive the shackle 78 and store it when the lock is not in use. The ends of the shackle legs 79 may have a chamfer 101. As noticed in FIG. 17, the legs 79 of the shackle 78 may be slightly bend together to provide a spring bias to hold the shackle 78 in the cutouts 86c. As the chamfered portions 101 are inserted over the cutouts 86c, the legs 79 are pushed apart a short distance requiring that the shackle must be slightly forced into the stored position shown in FIG. 17. Once in this position it is securely held in place and cannot be jarred or vibrated loose during bicycle movement or transport. In the stored position, the legs 79 of the shackle 26 cover the openings 85 to prevent water, dirt, snow, ice and the like from entering and interfering with operation of the lock.

The distance "d" between the inside surface of the saddle 96 and the bottom of case 73a is dimensioned to locate the key 83 away from the tube 20 to provide enough room for the rider to position his fingers to insert and turn key 83 with the bar 20 interfering.

The bicycle is locked by removing the shackle 78 from the stored position of FIG. 17 and inserting the ends 101 into the openings 85. As one chamfered portion 101 passes the lock bolt 94, the lock bolt will be urged to the right as shown in FIG. 16 until the notch 80 is adjacent the lock bolt 94 at which time the lock bolt 94 will spring back and occupy the notch 80. Once in this position the shackle 78 can only be removed by using a key. It is noted that the ends 101 of the shackle 78 do not protrude from the lock when they are inserted into the openings 85. Thus the shackle ends are not exposed and cannot be tampered with.

Like the other versions, this lock may also be used with a cable 66 to secure a bicycle to a stationary object such as pole 72.

These modified constructions shown in FIG. 14-17 show an extremely durable lock having very few individual pieces and providing a construction which is easily assembled and operated.

Thus, it has been shown by the foregoing, that a versatile lock is provided which can securely lock a bicycle, and, which may be used in combination with a cable to totally prevent unauthorized movement of the bicycle.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

I claim:

1. A bicycle lock for attachment about a bicycle frame member and wheel and comprising:
   a rigid metal case having locking openings located therein and extending only partially therethrough;
   a shackle with leg means extending from an end and adapted to fit into said locking openings, said shackle including tapered ends adapted to guide the legs of the shackle into a storage means, said legs being spaced apart a first distance whereby the legs of the shackle are urged apart when urged into contoured cutouts of the storage means to provide a spring force with the legs of the shackle gripping the contoured cutouts to hold the shackle securely in a stored position;
   said case having an internal chamber with lock cylinder means located therein and having a lock bolt for engaging and holding said shackle, said lock cylinder means comprising a modular unit assembled as a unit into the chamber of the lock case and providing said lock bolt to engage the shackle when the shackle leg means are inserted into the locking openings;
   saddle means extending outwardly of said case and having a contour to fit about the frame member and including spacing means for locating the lock cylinder away from the bicycle frame member to allow the lock cylinder to be accessible for unlocking the lock;
   clamp means for securing the lock to said frame member;
   restraining ears for retaining the clamp means on the saddle means;
   said storage means including the contoured cutouts extending along each side of said saddle means and being spaced apart a second distance which is greater than the first distance of said spaced apart legs for receiving the shackle and holding it securely when not in use to lock the bicycle, with said storage means being in alignment with the locking openings to locate the leg means of the shackle in proximity with the locking openings thereby covering the openings to prevent contaminants from entering the openings when the shackle is in the stored position;
   said case and the leg means and end of the shackle forming an enclosure encircling the associated frame member and adjacent wheel to prevent movement and removal of the wheel when the leg means are inserted into the locking openings.

2. The lock of claim 1 and further including:
   a flexible cable with end means adapted to fit about said shackle and having a length disposing the cable to be attached to a stationary object to prevent unauthorized movement of the bicycle.

* * * * *